(12) United States Patent
Witmond et al.

(10) Patent No.: US 7,739,201 B2
(45) Date of Patent: Jun. 15, 2010

(54) MAILPIECE TRACKING

(75) Inventors: Rod Witmond, Alpharetta, GA (US); George Brookner, Norwalk, CT (US)

(73) Assignee: Neopost Technologies, Bagneux (FR)

( * ) Notice: Subject to any disclaimer, the term of this patent is extended or adjusted under 35 U.S.C. 154(b) by 540 days.

(21) Appl. No.: 10/972,181

(22) Filed: Oct. 22, 2004

(65) Prior Publication Data
US 2006/0089921 A1    Apr. 27, 2006

(51) Int. Cl.
G06Q 10/00    (2006.01)

(52) U.S. Cl. .................. 705/333; 705/330; 705/336

(58) Field of Classification Search ................. 705/400, 705/1
See application file for complete search history.

(56) References Cited

U.S. PATENT DOCUMENTS

| | | | |
|---|---|---|---|
| 5,770,841 A | 6/1998 | Moed et al. | |
| 6,260,029 B1* | 7/2001 | Critelli | 705/408 |
| 6,463,354 B1* | 10/2002 | Pintsov | 700/227 |
| 6,557,755 B1* | 5/2003 | Pickering et al. | 235/376 |
| 6,865,561 B1* | 3/2005 | Allport et al. | 705/406 |
| 2002/0143700 A1* | 10/2002 | Wu | 705/1 |
| 2002/0165729 A1* | 11/2002 | Kuebert et al. | 705/1 |
| 2003/0004900 A1* | 1/2003 | Schwartz et al. | 705/401 |
| 2003/0046103 A1* | 3/2003 | Amato et al. | 705/1 |
| 2003/0101148 A1* | 5/2003 | Montgomery et al. | 705/404 |
| 2003/0114955 A1* | 6/2003 | Daniels, Jr. | 700/224 |
| 2003/0182018 A1* | 9/2003 | Snapp | 700/225 |
| 2004/0093312 A1* | 5/2004 | Cordery et al. | 705/401 |
| 2004/0215368 A1* | 10/2004 | Baker et al. | 700/226 |
| 2005/0228761 A1* | 10/2005 | Monsen et al. | 705/401 |
| 2006/0041519 A1* | 2/2006 | Ogg et al. | 705/402 |
| 2006/0184269 A1* | 8/2006 | Wilson et al. | 700/215 |

FOREIGN PATENT DOCUMENTS

| | | |
|---|---|---|
| EP | 0 741 376 A2 | 11/1996 |
| EP | 1 063 618 A2 | 12/2000 |
| EP | 1 439 496 A2 | 7/2004 |
| WO | WO 02/37426 A1 | 5/2002 |
| WO | WO 02/093323 A2 | 11/2002 |
| WO | WO 2004/012053 A3 | 2/2004 |

OTHER PUBLICATIONS

Miller, Shari Missman, "Featured Product, Mailing Equipment and Supplies", Office Solutions, v18n6, pp. 24-29, Jun. 2001.*

* cited by examiner

Primary Examiner—John W Hayes
Assistant Examiner—Kevin Flynn
(74) Attorney, Agent, or Firm—Townsend and Townsend and Crew LLP

(57) ABSTRACT

A method and system to process and track mailpieces. A code is printed on the mailpiece that can include an identification of a metering device generating the code and a subscriber number of a subscriber generating the mailpiece. The code is scanned during a processing step in a mailpiece delivery system, wherein information associated with the scanned code is stored in a database accessible by the user and allowing the user to track a movement of the mailpiece in the mailpiece delivery system.

21 Claims, 10 Drawing Sheets

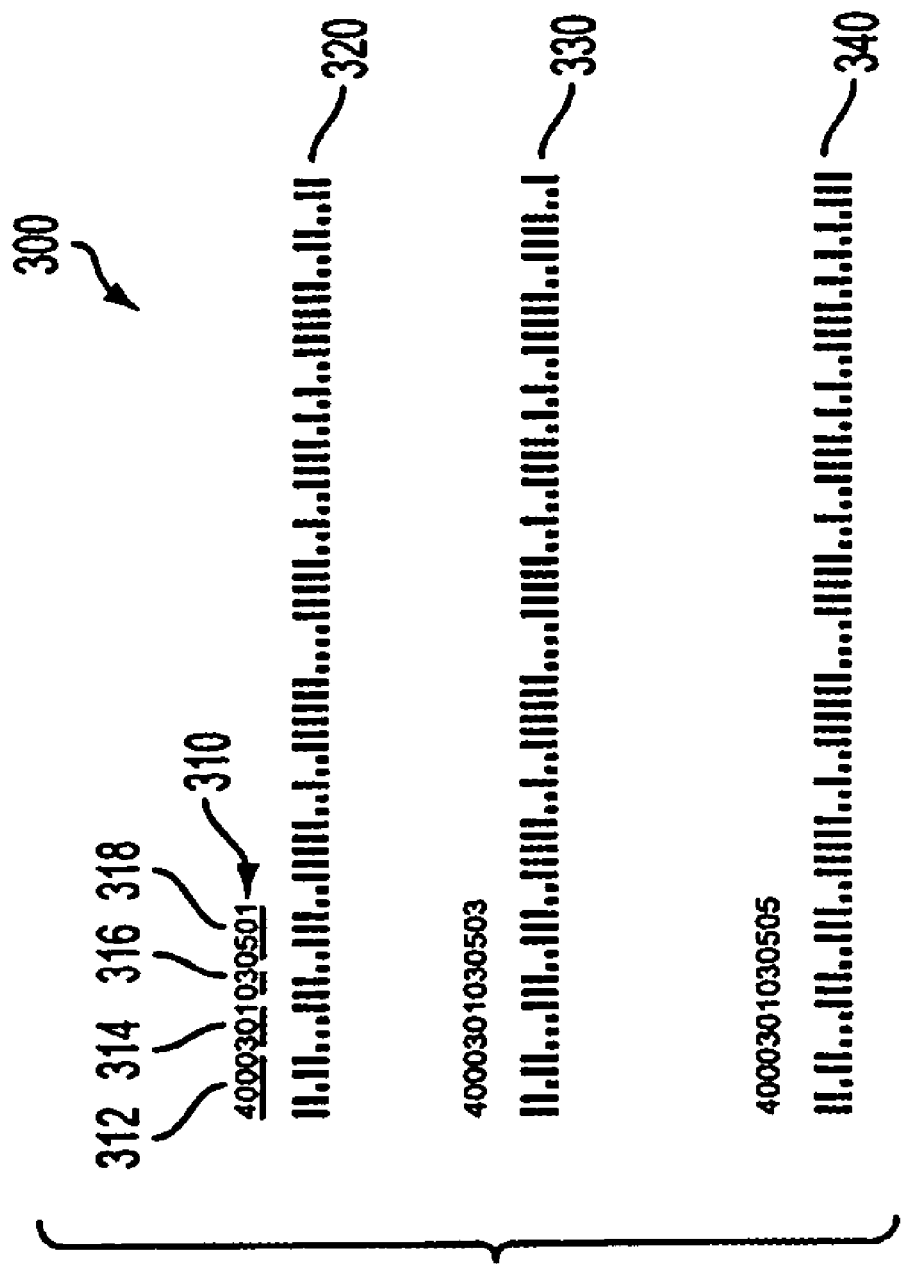

| 710 | 712 | 714 | 718 | 720 | 721 | 722 | 724 |
|---|---|---|---|---|---|---|---|
| STATUS/LOCATION OF MAILPIECE IN USPS INFRASTRUCTURE | METER REGISTERS ASCENDING/DESCENDING | ZIP | SUBSCRIBER ID UNIQUE ID / MAIL CLASS | PACKAGE VALUE | METER SERIAL NUMBER | NAME / ADDRESS | OTHER |

FIG. 7

MAILPIECE TRACKING

BACKGROUND OF THE INVENTION

1. Field of the Invention

The present invention relates to processing mail pieces and in particular to utilizing a code on a mailpiece to identify and track individual mailpieces.

2. Brief Description of Related Developments

Present mailing applications that afford the customer generating mailpieces the ability to track the progress of the mailpieces through the postal mailing infrastructure and eventually to the recipient involve special material handling by the mailpiece generator. The USPS utilizes a destination functionality service referred to as "CONFIRM", which provides for a subscriber to its service to imprint upon media (typically envelopes or paper tape) a barcode, referred to as the "Planet Code". The "Planet Code" is described for example in the "Confirm using Plant Code USPS" Field Operations Guide, data February 2001, First Edition, the disclosure of which is incorporated herein by reference in its entirety. This code provides for a number of numeric digits that define the customer and a mailing identifier. Generally, the Planet Code comprises a 14-digit barcode where the first two digits can represent a type of service being used and the next 11 digits can be used to identify the subscriber and mailing. The $14^{th}$ digit can be used as a check-sum that helps the USPS detect errors. Examples of the Planet Codes used in the USPS confirm service are illustrated in FIGS. 1A and 1B. The mailing identifier relates to the actual mailing (batch of mailpieces) adhering to postal batching requirements for approval mail types. Such handling would include the mechanics of documentation to be attached to, or related to, a mailpiece, typified by the certification mail process of the USPS, and relate to extra handling. Such extra handling will be obviated by this invention.

SUMMARY OF THE INVENTION

The present invention is directed to processing mail. In one embodiment, the method comprises scanning at least on mailpiece. Identifying a PLANET code on the mailpiece and determining a customer type from the PLANET code. A unique mailpiece identifier can also be determined from the code that can allow the mailpiece to be identified and tracked.

In another aspect the present invention is directed to a method of forming and tracking at least one mailpiece. In one embodiment the method comprises forming at least one two-dimensional indicia on the mailpiece, forming at least one single-dimensional indicia on the mailpiece, initially scanning the two-dimensional mailpiece to at least collect postage and delivery information and validate a source of the two-dimensional indicia; and subsequently scanning the at least one single-dimensional indicia on the mailpiece to collect identification information unique to the mailpiece that can be used to track the mailpiece.

In another aspect the present invention is directed to a system for processing and tracking a mailpiece. In one embodiment the system comprises a user system that generates an improved PLANET code that is associated with the mailpiece, the improved code including at least a vendor and customer type identification and a unique mailpiece identifier. At least one scanning device is included in the system that is adapted to read the information from the improved code. A database system coupled to the at least one scanner is adapted to store the read information and make the information available for tracking purposes.

BRIEF DESCRIPTION OF THE DRAWINGS

The foregoing aspects and other features of the present invention are explained in the following description, taken in connection with the accompanying drawings, wherein:

FIG. 3 are illustrations of a code incorporating features of the present invention.

FIG. 7 is an illustration of one embodiment of a layout of records and fields of a relational database for storage of information obtained from embodiments of the present invention.

DETAILED DESCRIPTION OF THE PREFERRED EMBODIMENT(S)

Figure 8:
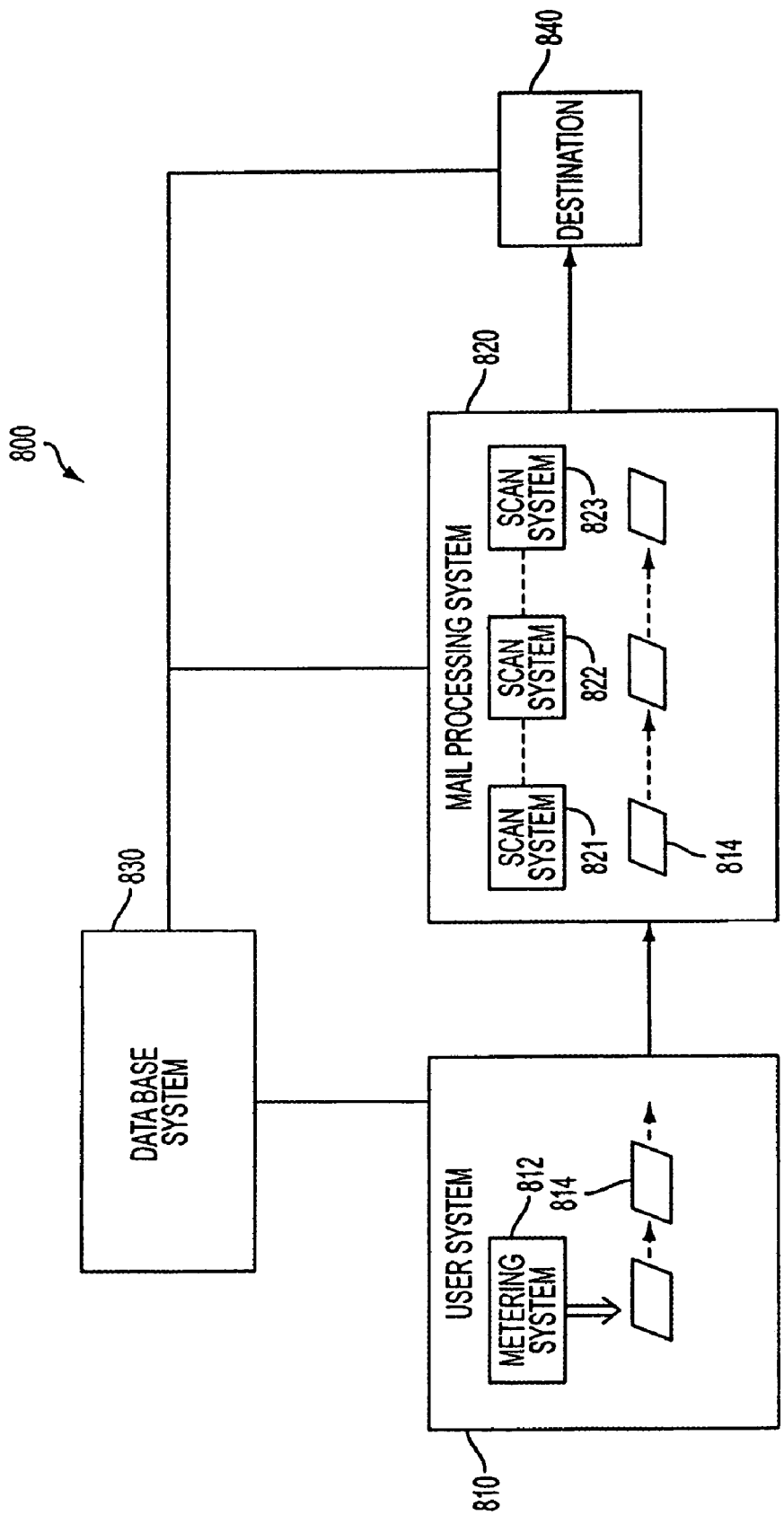
FIG. 8 is a block diagram of one embodiment of a system incorporating features of the present invention.

Referring to FIG. 8, a block diagram of a system 800 incorporating features of the present invention is illustrated. Although the present invention will be described with reference to the embodiment shown in the drawings, it should be understood that the present invention can be embodied in many alternate forms of embodiments. In addition, any suitable size, shape or type of elements or materials could be used.

As illustrated in FIG. 8, a system 800 incorporating features of the present invention generally utilizes a postage-metering system or device 812 to print an indicia such as a postal mark on a mailpiece 814. In the embodiments of the present invention, proof of postage indicia as well as a Planet barcode can be printed on the mailpiece 814. The Planet barcode could be in line with the indicia on the mailpiece or in the general proximity of the indicia. This is shown for example, in FIG. 2A. The indicia can be digital indicia.

In the user system 810, the mailpiece is imprinted with the indicia and Planet Code. During processing of the mailpiece in the delivery system 820, the mailpiece 814 might be scanned by one or more scanners 821-823 at various points during the delivery process. The delivery process could include any number of scanning points or locations. Eventually, the mailpiece 814 will be delivered to its destination 840, if the address processing and information is accurate.

A database system 830 can be used to collect data associated with the generation of the codes and each scan. The data can be used to track the progress of the mailpiece 814. Other information related to the mailpiece can also be stored in and retrieved from the database.

Figure 1A:
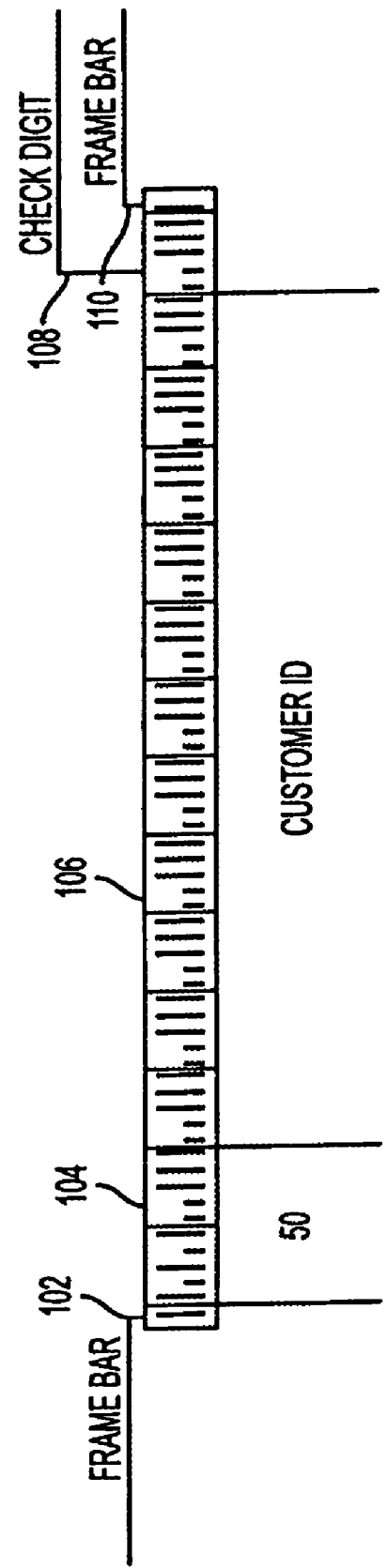
FIGS. 1a and 1b illustrate a code incorporating features of the present invention.
Figure 1B:
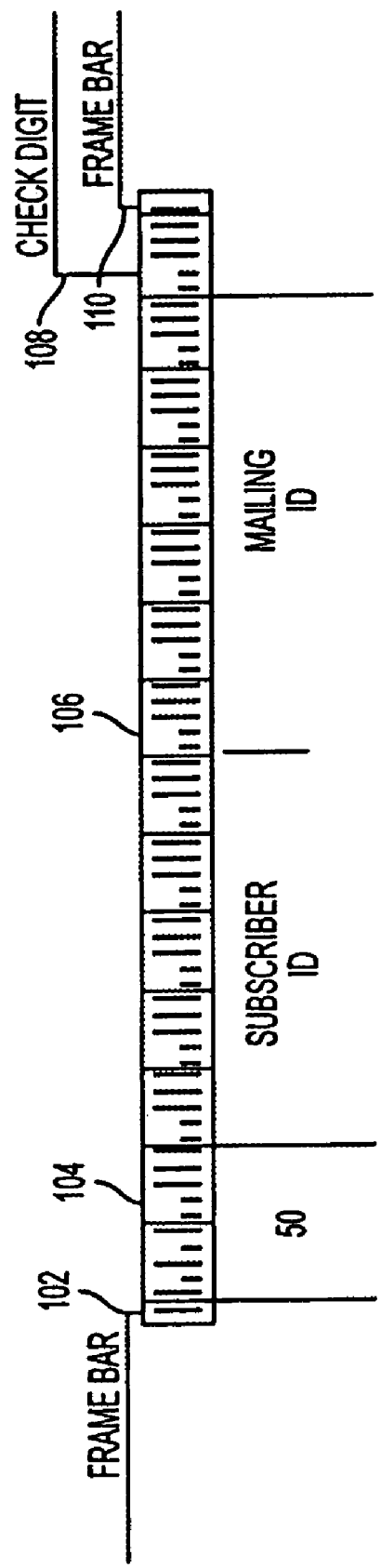
Figure 2A:
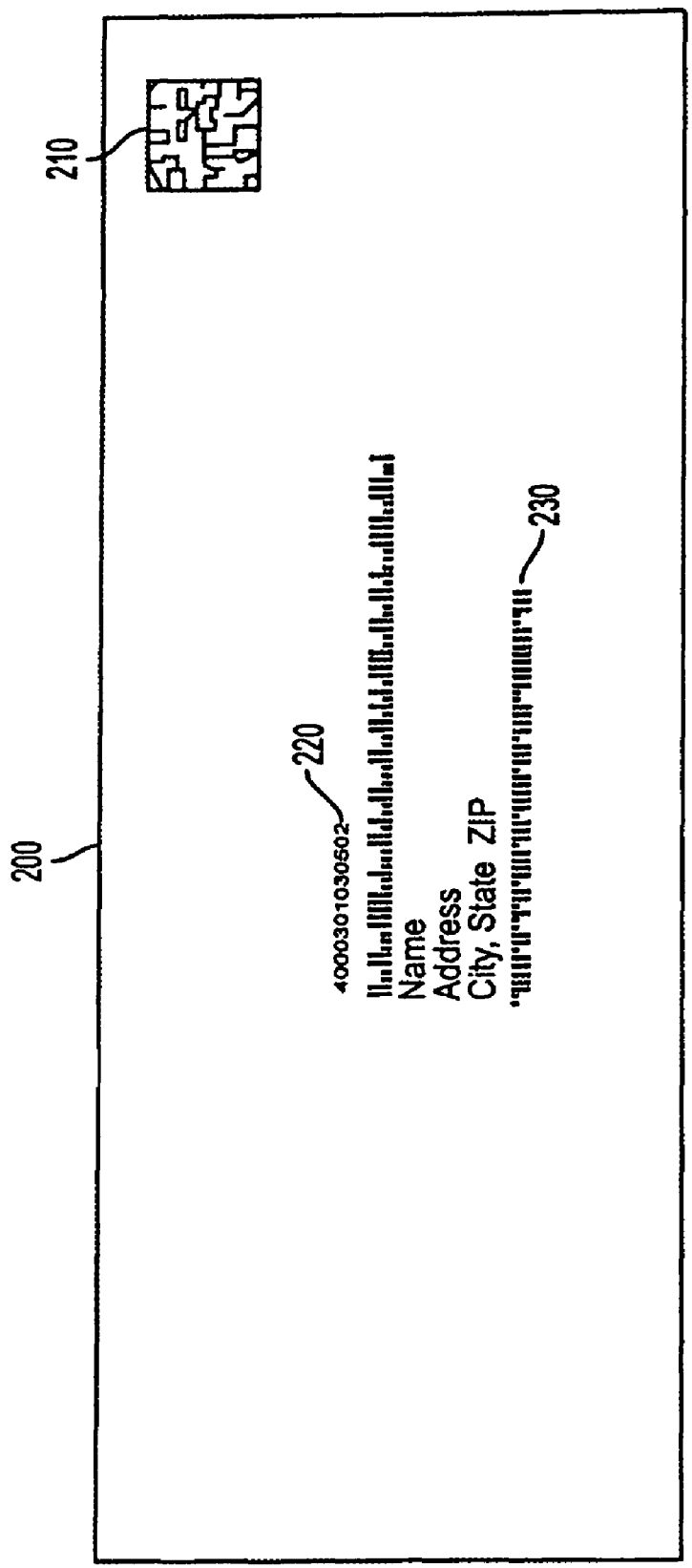
FIGS. 2A and 2B are illustrations of different embodiments of a mailpiece incorporating features of the present invention.

FIG. 2A illustrates one embodiment of the present invention in the form of a typical mailpiece 200. The mailpiece 200 could be presented as a parcel or package, as well. The envelope 200 contains an information based indicia 210, represented as a 2-dimensional barcode. The barcode containing information appropriate to the sender and mailpiece, as postage amount, serial number of the device imprinting the indicia, accounting information unique to the printing device, and as appropriate, cryptographically secure data validating the source device as the trusted producer of the indicia. Barcode 220, represents the USPS Planet tracking single dimensional barcode used within the postal processing infrastructure to be scanned any number of times for the purpose of tracking the mailpiece through the mail handling system 820 to its final destination 840 as illustrated in FIG. 8. Detailed illustrations of a barcode set up incorporating features of the present invention are shown in FIGS. 1A and 1B.

As shown in FIG. 1A the first bit 102 is a frame bar. The next sequence of bits 104 represents a type of service being used. The next sequence of bits 106 can comprise information, such as for example a customer ID. In one embodiment, referring to FIG. 1B, the information 106 could comprise a subscriber ID and a mailing ID. The sequence can also include a check digit bit 108 and a frame bar 110.

Barcode 210 has the capability of including all information necessary to characterize the mailpiece related to its information based indicia information as well as the Planet code's mailpiece tracking information. Planet code 220, due to the physical limitation in size of a single dimensional barcode generally provides for a data content of, for example, 14 or less numeric characters, thus limiting the amount of data in the barcode. In alternate embodiments, the barcode can provide for a data content of any suitable size that can be adapted to a mailpiece. Barcode 210 can contain many multiples in the quantity of data represented as compared with the limited amount of data in the Planet code 220. It may or may not be desired to repeatedly scan barcode 210 with its large amount of imbedded data, through the mail processing infrastructure, therefore indicia 220, with its limited data content and consequently rapid archiving, may be scanned multiple times and linked, as within relational databases, to its counterpart, indicia 210, the indicia 210 being scanned, for example, a single time.

Referring to FIG. 3, examples of labels 320, 330 and 340 incorporating features of the present invention are illustrated. Each label may include an alphanumeric code 310 and its representative barcode 320. Although labels are referred to with respect to this embodiment, it will be understood that the codes shown in FIG. 3 can be printed on any suitable medium.

As shown in FIG. 3, the alphanumeric code 310 shows 13 characters. A check digit (14$^{th}$) character is not shown. In alternate embodiments, the alphanumeric code can include any suitable number of characters.

Moving from left to right in FIG. 3, the first set 312 of characters can be allotted to the service provider, such as for example, the USPS. The next set 314 of characters can be allotted to the subscriber or vendor of the service, such as for example, NEOPOST, the assignee of the instant application. The next set 316 of characters can be assigned to identify a particular customer of the vendor. For example, the USPS uses the block 312 to identify the type of mail. The characters of the block 314 are generally assigned by the USPS to the particular contractor. The contractor assigns the block 316 to their customer. The blocks of characters 312, 314 and 316 generally do not change for a specific subcontractor and customer combination. The remaining character set 318 can be used for any suitable purpose, such as for example, a counter as illustrated in barcodes 320, 330, 340. It is a feature of the present invention to provide automatic incrementing of the code applied by the postage meter to each mailpiece. This allows each individual mailpiece to be tracked through the mail system on the basis of the scanned code.

In one embodiment, the barcode 300 could also include the identification of the metering device as well as the subscriber identifier. This would allow for uniquely associating a particular mailer to a specific meter producing the barcode. For example, a subscriber could utilize or have multiple meters. The disclosed embodiments would allow for separately tracking the output of each meter.

The information gleaned from barcodes 210 and 220, separately or in combination may be presented for monitoring purposes, by the Post, for a customer in a typical Internet methodology whereby the customer, based upon his predetermined credentials may have access to some or all of the archived data about the mailpiece in questions. The credentials, provided by the Post, could be based, for example, on the level of service purchased by the customer. The level of service could, for example, be limited to only tracking through the postal mechanical mail handling infrastructure, or the level of service could, for example allow monitoring of the mailpiece in question, to the actual destination customer.

By combining, via relational database manipulation, Planet Barcode 220 with Postnet (ZIP) code 230 data and indicia barcode 210 data, the sender of the mailpiece would now have access, via linkage through the Planet Barcode identification number, to information about the mailpiece destination address, corrected address, change of address that was unknown to the sender when the mailpiece was inserted into the postal mail stream. In effect, the sender of mailpieces may put uniquely sequentially numbered or uniquely randomly numbered Planet barcodes on any number of mailpieces, not knowing to whom the specific mailpiece is destined. However, once the mailpiece enters the postal mail processing stream and is scanned (or image video lifted to storage), the information from the scan or video lift is then linked to the Planet Barcode unique identification number to any mailpiece, thus affording the mailpiece sender to now obtain information about each specific mailpiece, not previously known to the sender. Should it happen that the destination address of a specific mailpiece be in error or the address changed (i.e. recipient moved), the correct (ed) address placed onto the mailpiece, when linked to the Planet Barcode, allows the sender, not only to identify the specific mailpiece, but update his address list accordingly.

FIG. 7 illustrates an exemplary layout of a database to store information or records related to the present invention. Field 710 could comprise the status/location of the mailpiece in the USPS infrastructure. The status or value of the associated meter's ascending or descending registers can be presented in Field 712. Field 714 could include the postal code. A subscriber ID, a unique ID and/or the mail class could be in Field 718. A postage value or payment could be in Field 720. The meter serial number or other meter identification is in Field 721. The name/address of the recipient might be found in Field 722. Field 724 can be reserved for other information. In an alternate embodiment any suitable arrangement of information can be used to provide a useful tracking report or data to the user.

Figure 4:
FIG. 4 is an illustration of another embodiment of a mailpiece including a code incorporating features of the present invention.
Figure 5:
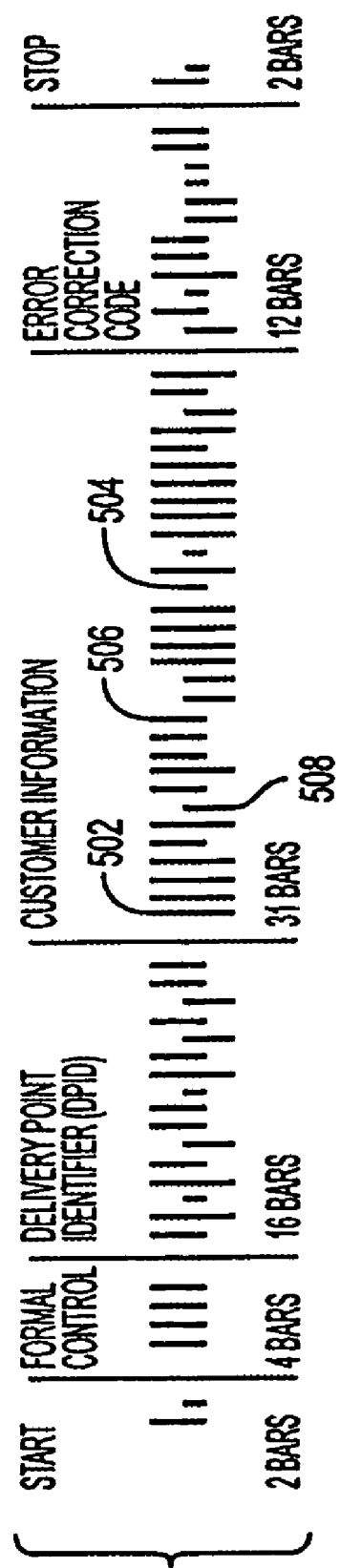
FIG. 5 is an illustration of a four state bar code.

In one embodiment, referring to FIG. 4, the Planet barcode 220 illustrated in FIG. 2A could be eliminated and the contents of the barcode could be imbedded in the indicia 410 on mailpiece 400. The indicia 410 would be typified by the information-based two-dimensional barcode images. In one embodiment, referring to FIG. 5, the indicia 410 of FIG. 4 could comprise an image having representative characteristics of a "FOUR STATE BARCODE" with 31 characters, yet the same length as POSTNET barcode, including 9 digits for tracking and providing additional content information. The term "four-state" describes the "up" and "down" bars in the barcode: a tall bar 502, a short bar 504, an upper half bar 506 and a lower half bar 508. It holds 31 characters and will be the same length as today's Postnet barcode, but it is ½₅th of an inch taller than the Postnet code. The four-state code will incorporate the Postnet barcode, which is used for sorting, and the PlanetCode, which mailers apply to letter or flat mail for tracking and other value-added services. The 31 characters are:

11-digit sort code;
9 digits for unique tracking;
3-digit service code;
6-digit sender identification; and
2 digits for application or barcode ID.

The system of the present invention could also utilize the barcode 220 of FIG. 2A to provide a link or cross-reference to a counterpart two-dimensional barcode 210 associated with the mailpiece 200. For example, information obtained from the two-dimensional barcode 210, such as a date of mailing, funds register contents, mail classification or originating zip or postal code, may now be combined in a query relational database methodology. The two-dimensional barcode need not be read/scanned as part of the mailpiece tracking, rather the single dimension barcode can be read rapidly anywhere within the mail processing system, thereby showing the progress of the mailpiece in the mail processing system. However, in concert with the independently scanned two-dimensional information based indicia, the single dimensional barcode may provide a link (typically via the symbology-producing device's serial number, or other similarly unique distinguishing identifier) associating the single dimensional barcode with its counterpart two-dimensional barcode. The result being the creation of a methodology to allow the acquisition of additional information generated from the two-dimensional barcode to be associated to the mailpiece as it traverses through the mail processing system (from sender to recipient). The aforementioned independently scanned two-dimensional information based indicia provides the noted additional information gleaned from associated barcode 2-D barcode, the additional information residing or archived in the infrastructure's back-end server or data storage system.

Figure 2B:

Referring to FIG. 2B, in one embodiment, a second, information-based two-dimensional barcode image 272 can be included on the mailpiece 270.

The second image 272 can be considerably smaller, with less information, than its counterpart indicia image 274, such that in combination, these two barcodes contain significantly more information than could be presented by the limiting size of the one-dimensional Planet barcode 220 of FIG. 2A, thus providing the ability to remove all single-dimensional barcodes from the mailpiece. An embodiment of the two barcode combination shown in FIG. 2B would bring to bear the ability to select and parse data elements of both barcodes and present them in any fashion (e.g. utilizing database query functionality) to present the elements in any way desired.

The disclosed embodiments provide the ability to allow Planet barcode printing to be part of the address printed on the stationary within a mailpiece. In one embodiment, the mailer can automatically generate, as part of the addressing block within a letterhead, the Planet code barcode, such that when the letter is folded for insertion into its envelope, the Planet barcode is readable, along with the address block.

Figure 6:
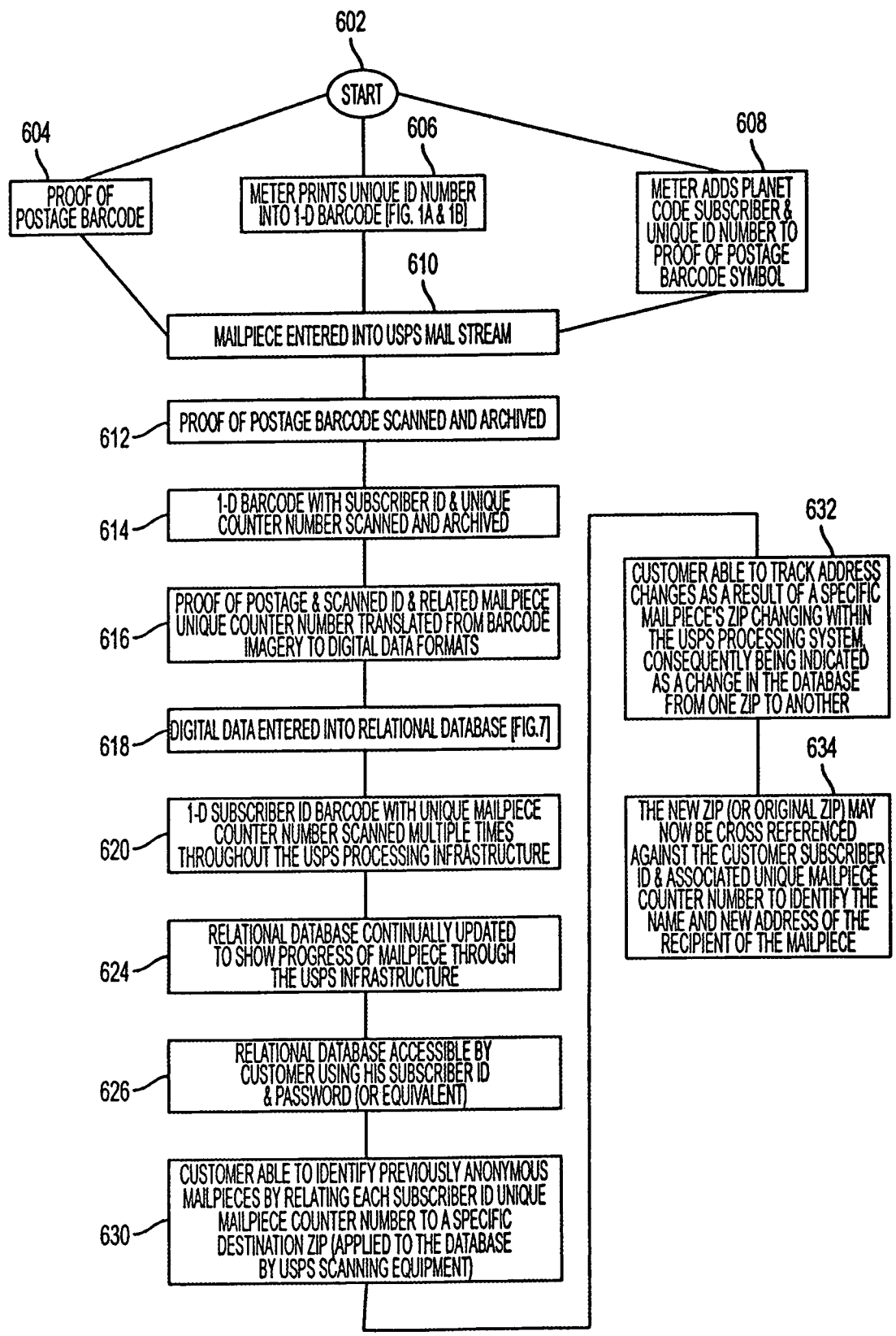
FIG. 6 is a flowchart of one embodiment of a method incorporating features of the present invention.

Referring to FIG. 6, one embodiment of a method incorporating features is illustrated. The proof of postage barcode is generated and printed 604 on a mailpiece. The postage meter generates and prints 606 a unique identifier as a one-dimensional barcode, as shown for example in FIGS. 1A and 1B. The postage meter can add a Planet Code subscriber 608 number and unique identifier number to the proof of postage barcode symbol 604.

Once the mailpiece enters 610 the USPS mail stream, the proof of postage barcode is scanned and archived 612. The one-dimensional barcode with subscriber identification and unique counter number is scanned and archived 614. The proof of postage and scanned identifier, and related mailpiece unique counter number, are translated 616 from barcode imagery to digital data formats. The digital data is entered 618 into a relational database, one example of which is shown in FIG. 7.

The one-dimensional subscriber identification barcode with the unique mailpiece counter number can be scanned 620 multiple times throughout the USPS processing infrastructure. The relational data base shown in FIG. 7 can be continually updated 624 to show or follow the progress of the mailpiece through the USPS infrastructure.

The relational database of FIG. 7 can be made accessible 626 by the customer, by using for example a subscriber ID and password. The customer is able to identify previously anonymous mailpieces by relating 630 each subscriber ID and unique mailpiece counter number to a specific destination ZIP CODE, as applied to the database by the USPS scanning equipment.

The customer is able to track 632 address changes as a result of a specific mailpiece zip code changing within the USPS processing system, the change being indicated as a change in the database from one zip code to another.

The new zip code (or original zip code) may now be cross-referenced 634 against the customer subscriber ID and the associated mailpiece counter number to identify the name and new address of the recipient of the mailpiece.

Further, utilizing the combination of existing postal databases wherein information gleaned from the mailpiece related to its Planet barcode content (and/or other mailpiece codes), demographic information about the receiver becomes available for access by the sender. In one embodiment, should it be identified in the processing of the mail that the address is incorrect or there has been a change of recipient address, the new or corrected information would be available to the sender. In effect, the Planet barcode can be cross-referenced or queried (via relational database standard techniques) to other mailpiece destination customer information. In another embodiment, should the initial scanning of the destination address reveal that a change of address occurred, or the address is incorrect, whereby the Post causes to be added to the mailpiece the correct address, the correct address information may also be linked to the Planet barcode, whereby the sender may access the information and subsequently update his address records. Further, by putting change of address information into the Post database, the change of address will occur at the early stages of mail stream processing, consequently eliminating the identification of the address change at the destination Post Office, causing the mailpiece to be re-entered into the mail stream for reprocessing to the corrected address. A third embodiment hereto, would provide for the sender to identify the ZIP code/address of the recipient, wherein the information is not known to the sender at the time the mailpiece is entered into the mail stream. That is to say, when a mailpiece received its proof of payment postmark and Planet barcode, it is not known to which piece of mail the postmark is applied. The Planet barcode reveals that a "transaction" number can track a mailpiece, but destination delivery information is not known. When the mailpiece is scanned in the Post's mail stream, the mailpiece's ZIP and or address information (whether digitally scanned or video lifted) is linked to the Planet barcode number, thus allowing the mailpiece sender to recover specific information about the mailpiece that was not known to the sender at the time of the mailpiece entry into the postal mail stream.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

The invention claimed is:

1. A method for tracking a mailpiece that includes a two-dimensional barcode and a one-dimensional barcode, the two-dimensional barcode including an identification of a metering device that generated the two-dimensional barcode, and the one-dimensional barcode including a vendor identifier, a customer identifier, and an article identifier that is unique for each mailpiece in a batch of mailpieces, the method comprising:
   a first scanning of information from both the two-dimensional barcode and the one-dimensional barcode during an initial processing step in a mailpiece delivery system;
   storing the scanned information in a database after the information is scanned, the stored information including the identification of the metering device, the vendor identifier, the customer identifier, and the article identifier;
   linking in the database the stored information scanned from the two-dimensional barcode with the stored information scanned from the one-dimensional barcode;
   a second scanning of the one-dimensional barcode during successive processing steps in the mailpiece delivery system;
   updating the database during the successive processing steps with information relating to the progress of the mailpiece;
   determining at a mail-processing center that a recipient address on the mailpiece is changed;
   transmitting new recipient address information to the database;
   associating in the database the new recipient address information with the scanned one-dimensional barcode;
   receiving a query based on information associated with the two-dimensional code;
   in response to the query, sending the new recipient address information based on information associated with the two-dimensional code; and
   after the first scanning, providing recipient address information to a sender of the mailpiece based on the one-dimensional barcode,
   wherein at least a part of the one-dimensional barcode is printed on the mailpiece before the recipient address for the mailpiece is established.

2. The method of claim 1 further comprising a vendor providing a customer with an access identification and password to allow the customer to track the movement of the mailpiece in the mailpiece delivery system as recorded in the database.

3. The method of claim 1, further comprising embedding a content of an identifier associated with the mailpiece in a proof purchase indicia, the proof of purchase indicia comprising the two-dimensional barcode.

4. The method of claim 1, further comprising providing a link in the one-dimensional barcode to the two-dimensional barcode.

5. The method of claim 1, further comprising printing a second two-dimensional barcode on the mailpiece, and forming the second two dimensional barcode in a fashion that is smaller than the two-dimensional barcode.

6. The method of claim 1 further comprising:
   identifying in a mail-processing center that a recipient address on the mailpiece is incorrect;
   determining a correct recipient address information and adding the correct recipient address information to the mailpiece;
   transmitting the correct recipient address information to the database; and
   associating in the database the correct recipient address information with the one-dimensional barcode printed on the mailpiece.

7. The method of claim 1, wherein the two-dimensional barcode is only scanned in the initial processing step of the mailpiece delivery system.

8. The method of claim 6, further comprising: accessing in the database the correct recipient address information via a query based on information associated with the two-dimensional barcode.

9. A method for updating address information during processing of a mailpiece that includes a two-dimensional barcode and a one-dimensional barcode, the two-dimensional barcode including an identification of a metering device that generated the two-dimensional barcode, and the one-dimensional barcode including a vendor identifier, a customer identifier that is unique for each mailpiece in a batch of mailpieces, the method comprising:
   receiving, at a database, information relating to the mailpiece obtained from a first scanning of the two-dimensional barcode and the one-dimensional bar code in an initial processing step of a mailpiece delivery system, wherein the information includes first address information corresponding to a recipient address on the mailpiece;
   storing the information relating to the mailpiece in the database after receiving the information, the stored information including the identification of the metering device, the vendor identifier, the customer identifier, and the article identifier;
   linking the stored information scanned from the two-dimensional barcode with the stored information scanned from the one-dimensional barcode in the database;
   receiving, at the database, information relating to progress of the mailpiece in the mailpiece delivery system obtained from one or more successive second scanning's of the one-dimensional barcode, wherein the information includes second address information;
   associating the second address information with a recipient to generate updated recipient address information;
   receiving, at the database, a query from a customer based on information associated with the two-dimensional barcode;
   returning to the customer the updated recipient address information; and
   after the first scanning, providing recipient address information to a sender of the mailpiece based on the one-dimensional barcode,
   wherein at least a part of the one-dimensional barcode is printed on the mailpiece before the recipient address for the mailpiece is established.

10. The method of claim 9, wherein the two-dimensional barcode is only scanned in the initial processing step of the mailpiece delivery system.

11. The method of claim 9, further comprising: sending the updated recipient address information to the mailpiece delivery system.

12. A method for tracking a mailpiece that includes a two-dimensional barcode and a one-dimensional barcode, the two-dimensional barcode including an identification of a metering device that generated the two-dimensional barcode, and the one-dimensional barcode including a vendor identifier, a customer identifier, and an article identifier that is unique for each mailpiece in a batch of mailpieces, the method comprising:

a first scanning of information from both the two-dimensional barcode and the one-dimensional barcode during an initial processing step in a mailpiece delivery system;

storing the scanned information in a database after the information is scanned, the stored information including the identification of the metering device, the vendor identifier, the customer identifier, and the article identifier;

linking in the database the stored information scanned from the two-dimensional barcode with the stored information scanned from the one-dimensional barcode;

a second scanning of the one-dimensional barcode during successive processing steps in the mailpiece delivery system;

updating the database during the successive processing steps with information relating to the progress of the mailpiece;

identifying in a mail-processing center that a recipient address on the mailpiece is incorrect;

determining a correct recipient address information and adding the correct recipient address information to the mailpiece;

transmitting the correct recipient address information to the database;

associating in the database the correct recipient address information with the one-dimensional barcode printed on the mailpiece;

receiving a query based on information associated with the two-dimensional code;

in response to the query, sending the new recipient address information based on information associated with the two-dimensional code; and after the first scanning, providing recipient address information to a sender of the mailpiece based on the one-dimensional barcode, wherein at least a part of the one-dimensional barcode is printed on the mailpiece before the recipient address for the mailpiece is established.

13. The method of claim 1, wherein providing the recipient address information includes identifying the mailpiece based on a query from the sender including at least one of the vendor identifier, the customer identifier, and the article identifier.

14. The method of claim 13, wherein providing the recipient address information includes identifying the mailpiece based on the customer identifier and the article identifier.

15. The method of claim 1 wherein the information associated with the two-dimensional code includes an identifier of the metering device, and the database is searchable based on the identifier of the metering device.

16. The method of claim 9, wherein providing the recipient address information includes identifying the mailpiece based on a query from the sender including at least one of the vendor identifier, the customer identifier, and the article identifier.

17. The method of claim 12, wherein providing the recipient address information includes identifying the mailpiece based on a query from the sender including at least one of the vendor identifier, the customer identifier, and the article identifier.

18. The method of claim 17, wherein providing the recipient address information includes identifying the mailpiece based on the customer identifier and the article identifier.

19. The method of claim 12 wherein the information associated with the two-dimensional code includes an identifier of the metering device, and the database is searchable based on the identifier of the metering device.

20. The method of claim 16, wherein providing the recipient address information includes identifying the mailpiece based on the customer identifier and the article identifier.

21. The method of claim 9 wherein the information associated with the two-dimensional code includes an identifier of the metering device, and the database is searchable based on the identifier of the metering device.

* * * * *